US009240103B2

(12) United States Patent
McLaughlin et al.

(10) Patent No.: US 9,240,103 B2
(45) **Date of Patent: *Jan. 19, 2016**

(54) SPIN TO WIN GAMING DEVICE

(71) Applicant: Bally Gaming, Inc., Las Vegas, NV (US)

(72) Inventors: Paul C. McLaughlin, Brigantine, NJ (US); Elaine Weigle, Forked River, NJ (US); Shawn Young, Egg Harbor Township, NJ (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,740

(22) Filed: Feb. 20, 2014

(65) Prior Publication Data

US 2014/0171185 A1 Jun. 19, 2014

Related U.S. Application Data

(63) Continuation of application No. 12/267,300, filed on Nov. 7, 2008, now Pat. No. 8,684,823.

(51) Int. Cl.

*G06F 17/00* (2006.01)
*G07F 17/34* (2006.01)
*G07F 17/32* (2006.01)

(52) U.S. Cl.

CPC ............ *G07F 17/34* (2013.01); *G07F 17/3209* (2013.01); *G07F 17/3239* (2013.01); *G07F 17/3244* (2013.01); *G07F 17/3262* (2013.01); *G07F 17/3267* (2013.01)

(58) Field of Classification Search

CPC . G07F 17/34; G07F 17/3267; G07F 17/3209; G07F 17/3239; G07F 17/3244; G07F 17/3262
USPC ........................................................ 463/25, 27
See application file for complete search history.

(56) References Cited

U.S. PATENT DOCUMENTS

2002/0183105 A1* 12/2002 Cannon et al. .................. 463/16
2003/0083943 A1 5/2003 Adams et al.
2004/0142742 A1 7/2004 Schneider et al.

(Continued)

*Primary Examiner* — Paul A D'Agostino
*Assistant Examiner* — Carl V Larsen
(74) *Attorney, Agent, or Firm* — Brooke W. Quist; Marvin A. Hein; Philip J. Anderson

(57) ABSTRACT

Various embodiments are directed to gaming machines, gaming systems, methods, and computer-readable media for presenting a multi-tiered promotional game having a promotional base game component, promotional bonus game component, and a cash giveaway component. According to one embodiment, the gaming system includes a player tracking system having a database of player gaming data that includes a record of multi-tiered promotional game entry points and multi-tiered promotional bonus game entry points. The gaming system also includes a plurality of gaming devices in communication with the player tracking system, wherein each gaming device presents a primary game. The gaming devices also include a secondary display associated with each gaming device, wherein the secondary display is capable of presenting a promotional base game or a promotional bonus game. The gaming system further includes a multi-tiered promotional game server in communication with the secondary display, wherein the multi-tiered promotional game server manages the promotional base game and the promotional bonus game.

6 Claims, 5 Drawing Sheets

(56) References Cited

U.S. PATENT DOCUMENTS

| | | | |
|---|---|---|---|
| 2004/0235548 | A1 | 11/2004 | Benbrahim |
| 2006/0063578 | A1 | 3/2006 | Bansemer et al. |
| 2007/0117608 | A1 | 5/2007 | Roper et al. |
| 2007/0167226 | A1 | 7/2007 | Kelly et al. |
| 2008/0009335 | A1 | 1/2008 | Walker et al. |
| 2008/0026832 | A1 | 1/2008 | Stevens et al. |
| 2008/0139275 | A1 | 6/2008 | Goss |

* cited by examiner

SPIN TO WIN GAMING DEVICE

CROSS-REFERENCE TO RELATED APPLICATIONS

This application is a continuation of U.S. patent application Ser. No. 12/267,300, filed on Nov. 7, 2008, entitled SYSTEM OF SPIN TO WIN, hereby incorporated by reference. It is also related to U.S. Pat. No. 8,591,317 issued Nov. 26, 2013, also hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Gaming machines have been developed with different features to captivate and maintain player interest. For example, gaming machines may include flashing displays, lighted displays, or sound effects to capture a player's interest in a gaming device. Another important feature of maintaining player interest in a gaming machine includes providing the player with many opportunities to win cash or prizes. For example, slots-style gaming machines have been developed having multiple paylines. Other gaming machines include second chance games or bonus games that provide players with additional opportunities to win an award. Alternatively, other gaming machines include large payouts in the form of progressive jackpots to entice players. In other gaming machines, a mystery-style bonus game are used to entice and enhance player excitement.

While these gaming machines including various features have been successful, there remains a need for gaming machines that enhances player excitement and increases winning opportunities.

SUMMARY

Briefly, and in general terms, various embodiments are directed to gaming machines, gaming systems, methods, and computer-readable media for presenting a multi-tiered promotional game having a promotional base game component, promotional bonus game component, and a cash giveaway component. According to one embodiment, the gaming machine includes a main display for presenting a primary game and a processor for managing play of the primary game. The gaming machine also includes a secondary display for presenting a multi-tiered promotional game having at least a promotional game component and a promotional bonus game component. The gaming machine further includes a display processor that reads incoming data translates the data into a web protocol, if necessary, and maps the data to the secondary display, wherein the display processor is in communication with the gaming processor of a gaming device. The gaming machine also includes one or more player tracking components for receiving player tracking information.

According to another embodiment, the gaming machine includes a main display for presenting a primary game and a multi-tiered promotional game having a promotional base game component and a promotional bonus game component.

The gaming machine also includes a processor for managing play of the primary game and the multi-tiered promotional game. The gaming machine further includes one or more player tracking components for receiving player tracking information where the player tracking components are in communication with the processor.

In addition to gaming machines, various embodiments are directed to gaming systems. According to one embodiment, the gaming system includes a plurality of gaming devices. Each gaming device presents a primary game and one or more multi-tiered promotional games. The gaming system also includes a player tracking system having a database of player gaming data. The gaming system further includes a promotional game server that manages a promotional game and a promotional bonus game.

In another embodiment, the gaming system includes a player tracking system having a database of player gaming data that includes a record of multi-tiered promotional game entry points and multi-tiered promotional bonus game entry points. The gaming system also includes a plurality of gaming devices in communication with the player tracking system, wherein each gaming device presents a primary game. The gaming devices also include a secondary display associated with each gaming device, wherein the secondary display is capable of presenting a promotional base game or a promotional bonus game. The gaming system further includes a multi-tiered promotional game server in communication with the secondary display, wherein the multi-tiered promotional game server manages the promotional base game and the promotional bonus game.

In addition gaming devices and gaming systems, various methods for presenting a multi-tiered promotional game are disclosed herein. According to one method, player eligibility is determined for a multi-tiered promotional game and is based on player tracking information. The promotional base game component is presented after play of a primary game if the player is deemed eligible for the multi-tiered promotional game. Promotional credits are awarded to the player for a winning outcome in the promotional base game component. The player is also enrolled in a cash giveaway component if the player is deemed eligible for the multi-tiered promotional game. The player is also awarded a bonus game entry point for a promotional bonus game component if the player is deemed eligible for the multi-tiered promotional game, wherein a predetermined number of bonus game entry points are required to play the promotional bonus game component.

According to another method, player tracking information is received from the player. The player tracking information includes one or more data fields having promotional points and promotional bonus entry points. A primary game is initiated in response to a player wager. The promotional base game is presented after the primary game if the player is eligible for the multi-tiered promotional game. Promotional credits are awarded to the player for a winning outcome in the promotional base game component. The player is also enrolled in a cash giveaway component if the player is deemed eligible for the multi-tiered promotional game. The player is also awarded a bonus game entry point for a promotional bonus game at the completion of the multi-tiered promotional base game, wherein a predetermined number of bonus entry points are required to play the promotional bonus game.

In yet another method, player tracking information is received at a gaming machine. A promotional game is presented after play of a base game for an eligible player, wherein player eligibility is based upon the player tracking information. The eligible player is also enrolled in a cash giveaway. Play of a promotional bonus game is initiated for the eligible player that has accrued a sufficient number of promotional bonus game entry points.

In addition to gaming devices, gaming systems, and methods, various embodiments of a computer-readable media comprising computer-executable instructions that, when executed by one or more processors, causes the one or more processors to present a multi-tiered promotional game. According to one embodiment, the computer-readable media causes one or more processors to receive player tracking information from a player, wherein the player tracking information includes one or more data fields having multi-tiered promotional points and multi-tiered bonus entry points; initiate a primary game in response to a player wager; present the promotional game after the primary game if the player is eligible for the multi-tiered promotional game; award promotional credits to the player for a winning outcome in the promotional game; enroll the player in a cash giveaway if the player is deemed eligible for the multi-tiered promotional game; and award the player an bonus game entry point for a promotional bonus game at the completion of the multi-tiered promotional game, wherein a predetermined number of bonus entry points are required to play the promotional bonus game.

In another embodiment, the computer-readable media causes one or more processors to receive player tracking information from a player, wherein the player tracking information includes one or more data fields having multi-tiered promotional points and multi-tiered bonus entry points; initiate a primary game in response to a player wager; present the promotional game after the primary game if the player is eligible for the multi-tiered promotional game; award promotional credits to the player for a winning outcome in the promotional game; enroll the player in a cash giveaway if the player is deemed eligible for the multi-tiered promotional game; and award the player an bonus game entry point for a promotional bonus game at the completion of the multi-tiered promotional game, wherein a predetermined number of bonus entry points are required to play the promotional bonus game.

In yet another embodiment, the computer-readable media causes one or more processors to receive player tracking information; present a promotional game after play of a base game for an eligible player, wherein player eligibility is based upon the player tracking information; enroll the eligible player in a cash giveaway; and initiate play of a promotional bonus game for the eligible player having accrued a sufficient number of promotional bonus game entry points.

Other features and advantages will become apparent from the following detailed description, taken in conjunction with the accompanying drawings, which illustrate by way of example, the features of the various embodiments.

DETAILED DESCRIPTION

Various embodiments disclosed herein are directed to multi-tiered promotional gaming systems and methods for providing multiple promotional games on a gaming device. In a promotional game, marketing or other non-wagered monies are used to fund the opportunity to play the game. Additionally, any monies won from a promotional game are not generally redeemable for cash, but rather is used to fund additional game play or the purchase of goods and/or services. According to one embodiment, the multi-tiered promotional game includes a promotional base game component, a promotional bonus game component, and a giveaway component. The promotional games are generally triggered in response to a qualified player achieving a predetermined performance threshold.

Figure 1:
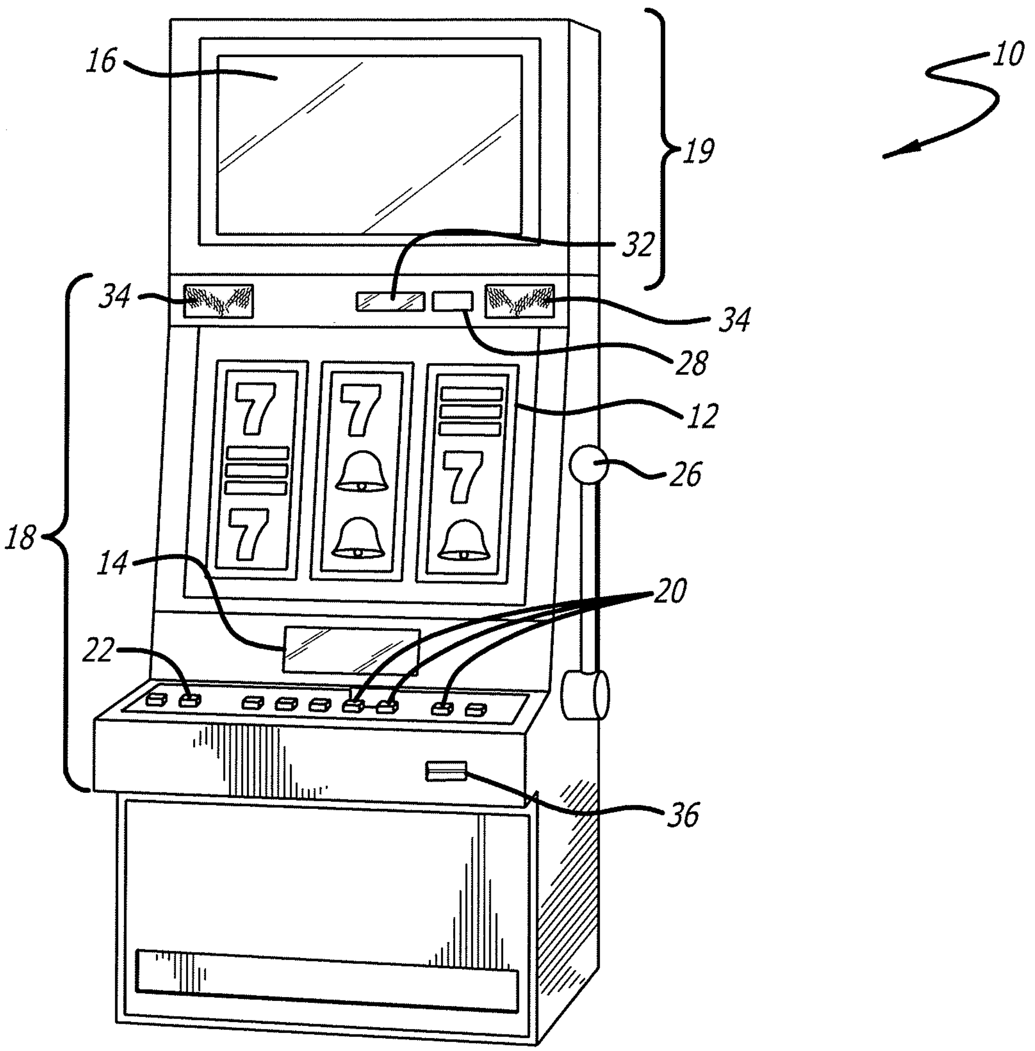
FIG. 1 is a perspective view of one embodiment of a gaming device presenting a multi-tiered promotional game.

Referring now to the drawings, wherein like reference numerals denote like or corresponding parts throughout the drawings and, more particularly to FIGS. 1-7, there are shown various embodiments of a gaming device presenting a multi-tiered promotional game. More specifically, as shown in FIG. 1, the gaming machine 10 includes a primary display 12, a secondary display 14, and a tertiary display 16. A base or primary game is generally presented on the primary display 12. The base game may be a slots-style game (e.g., mechanical, video, or a combination of mechanical and video), video keno, video poker, video blackjack, video roulette, Class II bingo, central determination games, games of skill, games of chance involving some player skill, or any combination thereof.

The multi-tiered promotional games may be presented on the secondary display 14 and/or the tertiary display 16. Alternatively, the multi-tiered promotional games may be presented on the primary display 12 after the presentation of the base game. In another embodiment, the multi-tiered promotional games are presented in a separate pop-up window on the primary display 12. In yet another embodiment, the multi-tiered promotional games are presented in a split screen manner with a portion of the primary display 12 presenting the promotional games and another portion presenting the base game. In another embodiment, the multi-tiered promotional game is presented on the primary display 12 as disclosed in U.S. Provisional Application No. 61/019,824, entitled "Video Switcher and Touch Router Device for a Gaming Machine," filed on Jan. 8, 2008, which is hereby incorporated herein by reference.

According to one embodiment, the multi-tiered promotional game consists of a promotional base game component, a promotional bonus game component, and a giveaway (e.g., cash or prize) component. In another embodiment, the multi-tiered promotional game includes one or more promotional base game components, one or more promotional bonus game components, and one or more giveaway components. In one embodiment, a player may select a particular promotional base or bonus game. Alternatively, each game component maybe randomly selected or pre-selected by the gaming establishment. For example, gaming establishment may select the promotional game components available for play to the player based upon a predetermined criteria such as, but not limited to, player card level, number of accrued player points, or the like.

The gaming establishment implementing the multi-tiered promotional game may also establish a predetermined time or times when one or more patrons (or a selected subset of patrons) are provided the opportunity to win a prize, gift, or money, or entry into one or more games. According to one embodiment, the multi-tiered promotional game is only available to identified players. An identified player is a player having a player account that has inserted a player tracking card into a gaming machine or has inputted other identifying information such as, but not limited to, a personal identification number (PIN) or biometric data. In another embodiment, an identified player is a player that has inputted player tracking information into a gaming machine, is actively playing a game, and has earned a minimum number of player club points or promotional dollars. Alternatively, all active players at a predetermined time or times are eligible to play the multi-tiered promotional game.

The gaming establishment is able to define a unique promotional code for each promotion (e.g., Summer promotion, Spring Promotion, VIP Promotion, or the like). Additionally, various properties of the multi-tiered promotional games are configurable by the gaming establishment. Each promotion is customizable according to promotion start date, promotion end date, daily start time, daily end time, frequency of the presentation of a base promotional game, minimum and maximum prize value for the promotional base game, minimum and maximum prize value for the promotional bonus game, prize value for the giveaway, expiration date for prizes won in promotion, number of winning positions (e.g., first, second, third, fourth, and fifth place), number of winners per positions (e.g., one first place winner, two third place winners, five third place winners, ten fourth place winners, and twenty fifth place winners), prize value for each winning position, and any animation sequences for winning and losing players.

According to one embodiment, the promotional base game is the first component of the multi-tiered promotional game. The promotional base game is a pre-scheduled game that is occurs on a predefined cycle in minutes (e.g., every 60 minutes). Generally, the promotional base game is automatically presented to a qualified player (i.e., identified player having accrued a sufficient number of points for the promotional game) after play of the primary game at the pre-scheduled time. Alternatively, the player is presented with an option to play the promotional base game or defer play of the promotional base game to a later time. Entry into the promotional base game may be saved on a backend system or issued to a player as a voucher or token.

Figure 2:
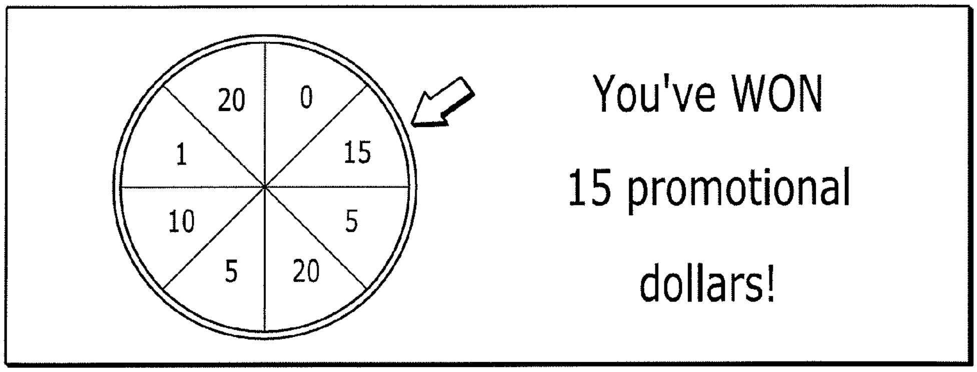
FIG. 2 is a screenshot of one embodiment of a multi-tiered promotional game.

In one embodiment, the promotional base game is a spinning wheel game. As shown in FIG. 2, the wheel is divided into multiple segments where each segment is assigned a prize or a prize amount. In the embodiment depicted in FIG. 2, one or more segments of the wheel have a zero prize value. Additionally, the spinning wheel game includes a fixed pointer for identifying a segment. Optionally, the pointer may also move (clockwise or counterclockwise) while the wheel is spinning. As shown in FIG. 2, a message is also presented to the player notifying the player of the outcome of the spinning wheel game. Optionally, the message may also include animation, movie clips, or sound clips to add to the excitement of the promotional base game.

The promotional base game is generally the lowest tier of the multi-promotional game since a player is not guaranteed to win a prize. For example, as shown in FIG. 2, a wheel segment has a zero value. In another embodiment, all the segments of the spinning wheel game have a winning prize value. The winning prize values in the promotional base game have lower values as compared to the prizes awarded in the promotional bonus game and the cash giveaway in order to differentiate the promotional base game from other promotional games.

In another embodiment, the promotional base game is a dart game. A dart board is presented on the display and a dart is shown hitting a spot on the dart board. The spot corresponds to a prize or a prize amount (including a zero prize amount). Alternatively, play of the dart game is an automated sequence for entertainment purposes only and a subsequent screen presents the prize or prize amount won. In another embodiment, the dart game is a game of skill. For example, the player may time the throwing of the dart as the dart moves back and forth on the display. Accordingly, player skill influences the outcome of the game. Alternatively, the outcome of the dart game is predetermined, but allowing the player to throw the dart gives the player the impression that the game is a game of skill.

As those skilled in the art will appreciate, the promotional base game component of the multi-tiered promotional games may be any game of chance, game of skill, or central determination game known or developed in the art.

In use, from the perspective of the player, the player is presented with the opportunity to play a promotional base game. The player is typically notified with a message on one or more of the display screens that they have been selected to play the promotional base game. According to one embodiment, the promotional base game (e.g. spinning wheel game) is an automated game. Once the player is awarded the promotional base game, the wheel automatically spins and stops. Alternatively, the player may start and/or stop the spinning of the wheel. Allowing the player to stop the wheel gives the player the impression that the promotional base game is a game of skill. Nevertheless, the outcome of the promotional game is generally selected prior to presentation or play of the promotional base game.

In use, from the perspective of the gaming system, the gaming system determines that a prescheduled time for presentation of a promotional base game has been established. The gaming system identifies and selects all the qualified players for the promotional base game. Once all the qualifying patrons have been selected, the patrons are randomly selected for each available position on the promotional game. For example, one first place winner, two second place winners, and five third place winners are selected from the pool of qualified players. The remaining qualified players are then assigned as non-winners. Promotional base game sequences are presented to the players that represent the players' selected position. Winning players are notified of the amount of promotional monies won by the player, and losing players are notified that they did not achieve a winning outcome.

The promotional bonus game is the second component of the multi-tiered promotional game. Each time the player is included in the promotional base game, the player earns an entry point (or token) into the promotional bonus game. Once the player has earned a sufficient number of entry points, the promotional bonus game is automatically activated. The promotional bonus game may be presented to the player after play of the primary game or after play of the promotional base game. Alternatively, the player may save play of the promotional bonus game for later play. If the player elects to save or defer play of the promotional bonus game, entry into the promotional bonus game is saved on a backend system or issued to the player as a voucher or other token.

In one embodiment, the promotional bonus game is another play of the base promotional base game. For example, the promotional bonus game is another spin of the spinning wheel game where all the segments of the wheel are winning outcomes or have larger prize values as compared to the wheel segments for the promotional base game. In alternate embodiments, the promotional bonus game is a different game from the base promotional game. The promotional bonus game may be any game of chance, game of skill, or central determination game.

In use, the player is generally notified that a sufficient number of bonus points (or tokens) have been accumulated, and the player is eligible to play a promotional bonus game. According to one embodiment, the promotional bonus game is presented to the player after play of the promotional bonus game. Alternatively, the promotional bonus game is presented some time after a player has qualified for promotional bonus game. In yet another embodiment, the player is given the option to defer or save play of the promotional bonus game for a later time. At the conclusion of the promotional bonus game, the player's accumulated entries are reset to zero, and the player is eligible to accumulate bonus entry points for future play of another promotional bonus game.

The promotional bonus game may be configured in a similar manner as the promotional base game. When establishing the promotional game, the gaming establishment may determine the number of entries required to play the promotional bonus game, minimum and maximum prize value for the promotional bonus game, minimum and maximum prize value for the promotional bonus game, expiration date for prizes won in the promotion, number of winning positions (e.g., first, second, third, fourth, and fifth place), number of winners per positions (e.g., one first place winner, two third place winners, five third place winners, ten fourth place winners, and twenty fifth place winners), prize value for each position, and any animation sequences for winning and losing players. Alternatively, the gaming establishment may select a promotional bonus game configuration from a menu of preconfigured bonus games. Additionally, the gaming establishment may associate different promotional bonus games with different promotions (e.g., wheel spin bonus game with the Summer promotion, dart bonus game with Spring promotion, and the like).

The third component of the multi-tiered promotional game is a giveaway component. The giveaway component may be a cash giveaway or a prize giveaway. The prize for the prize giveaway may be a tangible item such as, but not limited to, a car, boat, motorcycle, or jewelry. Alternatively, the prize may be non-tangible items such as, but not limited to, a vacation, tickets to a show or sporting event, spa services, or the like. In one embodiment, an entry to the giveaway is awarded each time a player is actively playing a gaming during the prescribed time. In another embodiment, an entry into the giveaway is awarded each time a player qualifies to play a promotional base game. According to one embodiment, a winning entry is randomly selected from all the entries into the giveaway. The giveaway is typically awarded to a player at the end of the promotional period of the multi-tiered promotional game. The promotional period may be any length of time (e.g., one week, month, six months, one year, or the like) selected by the gaming establishment.

In another embodiment, the multi-tiered promotional game includes a plurality of giveaway components. For example, a giveaway component having a smaller value (e.g., free show tickets) is awarded daily to a randomly-selected, qualified player, and one or more larger prizes are given away at the end of the promotional period (e.g. $25,000, a car, vacations) are given away at the end of the promotion. Generally, the multi-tiered promotional game includes a giveaway at the end of the promotion. By providing the a giveaway at the end of the promotion, players are encouraged to return for the giveaway results or to return to a gaming establishment to play the multi-tiered promotional game in order to increase the player's chance of winning the giveaway.

Referring back to FIG. 1, the displays 12, 14, 16 are video displays. In one embodiment, the primary, secondary, and tertiary displays 12, 14, 16 are flat panel displays including by way of example only, and not by way of limitation, liquid crystal, plasma, electroluminescent, vacuum fluorescent, field emission, LCOS (liquid crystal on silicon), and SXRD (Silicon Xtal Reflective display), Laser, or any other type of panel display known or developed in the art. These flat panel displays may use panel technologies to provide digital quality images including by way of example only, and not by way of limitation, EDTV, HDTV, or DLP (Digital Light Processing). In another embodiment, the flat panel displays are widescreen displays that are mounted in the gaming cabinet in a portrait or landscape orientation. In other embodiments, the displays 12, 14, 16 are cathode ray tube monitors or projection monitor displays.

As shown in FIG. 1, the secondary display 14 is positioned below the primary display 12, and the secondary display 14 is smaller than the primary display 12. As those skilled in the art will appreciate, the secondary display 14 may be positioned above the primary display 12, adjacent to the primary 12 or tertiary display 16, on the player interface, or any location on the gaming machine within the line-of-sight of a player. According to one embodiment, the secondary display 14 is a graphical interface, which is the subject of U.S. patent application Ser. No. 10/943,771, filed Sep. 16, 2004, which is hereby incorporated herein by reference.

The graphical interface includes a web content capable display screen and an embedded processor. Preferably, the web content capable display screen presents web information to a user via the display screen. The embedded processor preferably utilizes an internal operating system and communicates with the gaming processor of the gaming machine. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to play a secondary game, input information, make selections, receive promotional information or other types of information including, but not limited to, notification that the player has been entered into a promotion award or has won a promotional award (FIG. 2). Additionally, the display allows the player to access and manage a player account as shown in FIGS. 3-4.

Figure 3:
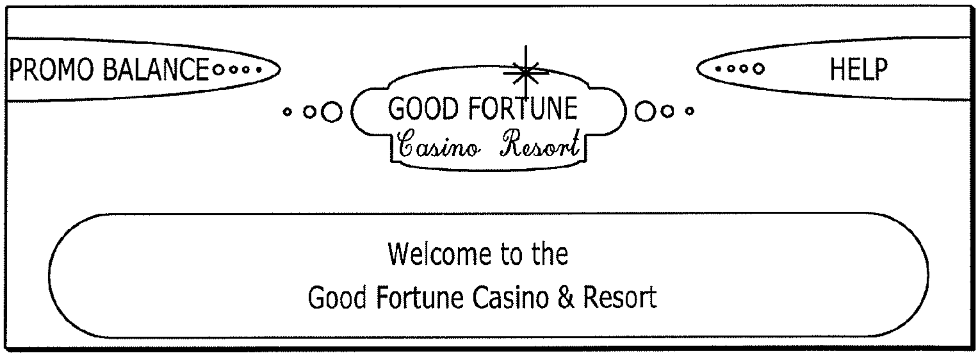
FIG. 3 is a screenshot of another embodiment of a multi-tiered promotional game.
Figure 4:
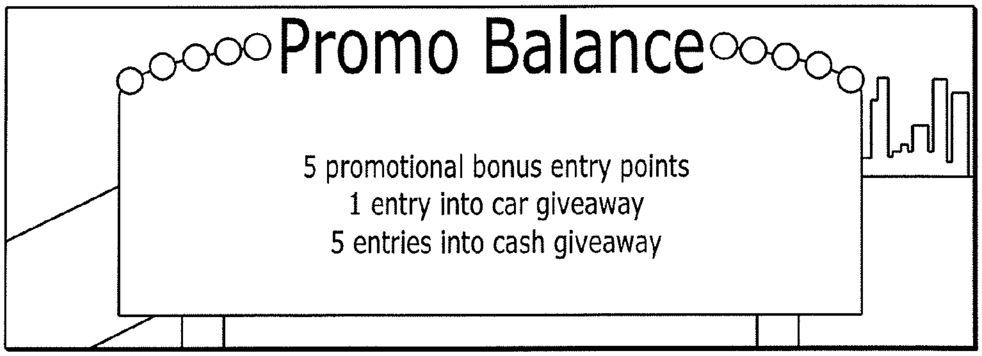
FIG. 4 is a screenshot of yet another embodiment of a multi-tiered promotional game.

FIG. 3 illustrates one embodiment of a default screen shot of the multi-tiered promotional game. The screen shot presents two video representations of buttons, for example, that allow a player to access a promotional balance or request help. As those skilled in the art will appreciate, additional functions not shown on the display may also be presented to the player. FIG. 4 is a screen shot of one embodiment of a promotional balance display. As shown in FIG. 4, the player has earned five promotional bonus game entry points, one entry into the car giveaway, and five entries into the cash giveaway. The display shown in FIGS. 3-4 may also include animation and sound effects to provide a richer sensory experience for the player.

As shown in FIG. 1, the gaming machine 10 includes a player interface consisting of a plurality of player-activated buttons 20 used for various functions such as, but not limited to, selecting a wager denomination, selecting a number of games to be played, selecting the wager amount per game, initiating a game, or cashing out money from the gaming machine 10. In various embodiments, the player-activated buttons 20 function are, but are not limited to, mechanical buttons, electromechanical buttons, touch screen buttons, or soft key buttons. According to one embodiment, the buttons 20 are backlit to indicate whether the button is active. In other embodiments, other input devices, such as but not limited to, touch pad, track ball, mouse, switches, toggle switches, are included with the gaming machine to also accept player input.

As shown in FIG. 1, a button 22 on the player interface allows a player to swap (i.e., change the display content between the displays 12, 14, and 16). Accordingly, the player may configure the gaming machine 10 to allow one or more of the multi-tiered promotional games to be presented on the main display 12 or the tertiary display 16. In another embodiment, a button (not shown) is provided or associated with a player tracking display 32 or other displays on the gaming machine allows the player to swap display content. The button 22 may be toggle switch, rocker switch, rotary dial switch, or any other suitable physical input device.

In yet another embodiment, the player interface includes a universal button module that provides a dynamic button system adaptable for use with various games, as disclosed in U.S. application Ser. No. 11/106,212, entitled "Universal Button Module", filed Apr. 14, 2005 and U.S. application Ser. No. 11/223,364, entitled "Universal Button Module", filed Sep. 9, 2005, which are both hereby incorporated herein by reference.

In yet another embodiment, a cellular phone or other input device (e.g., PDA), separate and apart, from the gaming machine may also be used to input various player choices and information to enhance the player's interactive experience with the gaming machine. In this embodiment, the gaming machine 10 includes an IR sensor, RF sensor, BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine.

In yet another embodiment, the tertiary display 16 presents game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In another embodiment, the tertiary display 16 presents a secondary game such as, but not limited to, a bonus game, a progressive game, or another game of chance such as, but not limited to, video slots, video keno, video poker, video blackjack, video roulette, Class II bingo, games of skill, games of chance involving some player skill, or any combination thereof. Alternately, the tertiary display 16 presents non-game related information such as, but not limited to, advertisements, news, information on sports betting and betting options for those sporting events, requests for drinks or food, concierge services, or promotional information (e.g., information relating to player's club).

As shown in FIG. 1, the main cabinet 18 of the gaming machine 10 is a self-standing unit that is generally rectangular in shape. In another embodiment, the main cabinet is a slant-top gaming cabinet. Alternatively, in other embodiments, the gaming cabinet may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine is a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated herein by reference.

As shown in FIG. 1, the gaming machine 10 includes a top box 19 and a main cabinet 18. According to one embodiment, the top box 19 is a separate and distinct component that is affixed to the main cabinet 18. In another embodiment, the top box 19 is an area that is partitioned from the main cabinet 18. Alternatively, the top box 19 and the main cabinet 18 may be contiguous areas with the outward appearance of two distinct components. In another embodiment, the top box 19 also includes a display glass (not shown) that includes the name of the game, artwork, game instructions, pay table, or other information relating to one or more games presented on the gaming machine 10.

The gaming machine 10 shown in FIG. 1 is also in communication with a player tracking system. The player tracking system allows a casino to monitor the gaming activities of various players. Additionally, the player tracking system is able to store data relating to a player's gaming habits. That is, a player can accrue player points that depend upon the amount and frequency of their wagers. Casinos can use these player points to compensate the loyal patronage of players. For example, casinos may award or "comp" a player free meals, room accommodations, tickets to shows, and invitations to casino events and promotional affairs. In one embodiment, the player's club level (e.g., Silver, Gold, Platinum), player rating, or total number of player points may qualify a player for a multi-tiered promotional game. In another embodiment, the player's club level adjusts the pay table for a primary game. Accordingly, a higher rated player wins more money for a given outcome as compared to a lower level (or unrated) player.

Typically, the player tracking system is operatively connected to one or more input components on the gaming machine 10. These input components include, but are not limited to, a slot 28 for receiving a player tracking card, a keypad or equivalent, an electronic button receptor, a display 32, a touch screen, or the like. The player tracking system may also include a database of all qualified players (i.e., those players who have enrolled in a player rating or point accruing program). Generally, the database for the player tracking system is separate from the gaming machines.

The main cabinet 18 of the gaming machine also houses a game management unit (not shown) that includes a CPU, circuitry, and software for receiving signals from the player-activated buttons 20, operating the games, and transmitting signals to the respective game displays 12, 14, 16 and speakers 34.

In various embodiments, game program may be stored in a memory (not shown) comprising a read only memory (ROM), volatile or non-volatile random access memory (RAM), a hard drive or flash memory device or any of several alternative types of single or multiple memory devices or structures. Optionally, the gaming machines 10 includes one or more data repositories for storing data. Examples of information stored by the gaming machines 10 include, but are not limited to, accounting data, maintenance history information, short and/or long-term play data, real-time play data, sound data, video data, or animation data.

As shown in FIG. 1, the gaming machine 10 includes a ticket reader/ticket printer slot 36 that is associated with a cashless gaming system (not shown). According to one embodiment, the slot 36 is used for the ticket reader and ticket printer. Accordingly, the same slot 36 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

In another embodiment, the gaming machine 10 includes an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machine 10 may participate in a gaming tournament. In one embodiment, the gaming tournament is a competitive gaming tournament having one or more winners. Alternatively, the gaming tournament is a cooperative gaming tournament where all eligible gaming machines win a particular award.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

Figure 5:
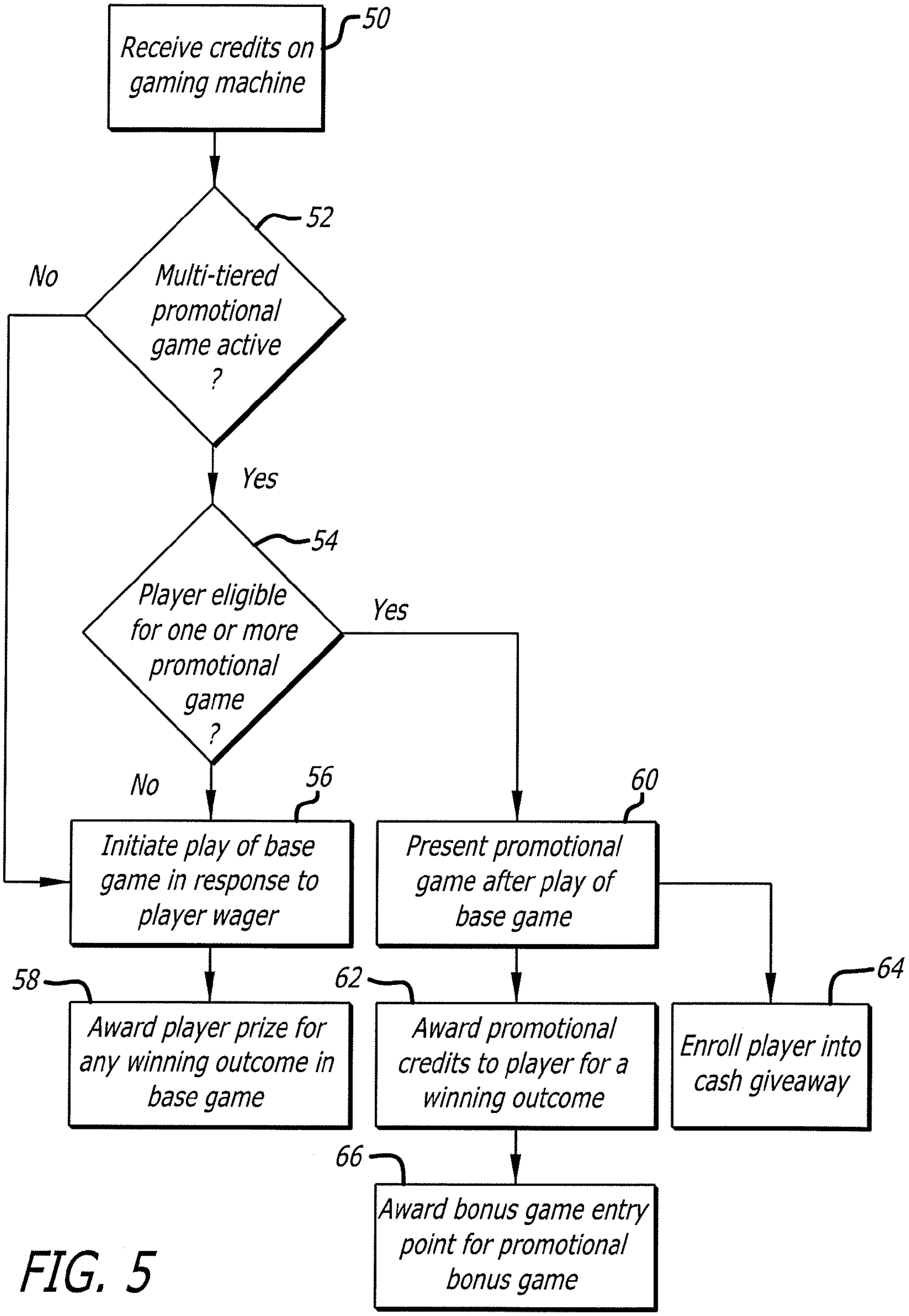
FIG. 5 is a flow diagram of one method of presenting a multi-tiered promotional game on a gaming device.

FIG. 5 illustrates one method of presenting a multi-tiered promotional game. As shown in FIG. 5, credits are received on the gaming machine at step 50. The credits may be promotional credits, cash, or vouchers having credits thereon. After credits have been entered on the gaming machine 10, the gaming machine (or gaming system) determines whether a multi-tiered promotional game is active at step 52. If the promotional game is inactive, play of the base game is initiated in response to a player wager at step 56. At the conclusion of the game, the player is awarded prize for any winning outcome at step 58. If the multi-tiered promotional game is active, a player's eligibility for one or more promotional games is determined at step 54. If the player is not eligible, play of the base game continues and/or a message may be displayed encouraging the player to continue play in order to become eligible to play the promotional games. If the player is eligible for the multi-tiered promotional game, the promotional game is presented after play of the base game at step 60. If the promotional game outcome is a winning outcome, the player is awarded promotional credits at step 62. At the conclusion of the promotional game, the player is awarded a bonus game entry point for a promotional bonus game at step 66. Additionally, if the player is eligible for the multi-tiered promotional game, the player is enrolled into a cash giveaway at step 64.

Figure 6:
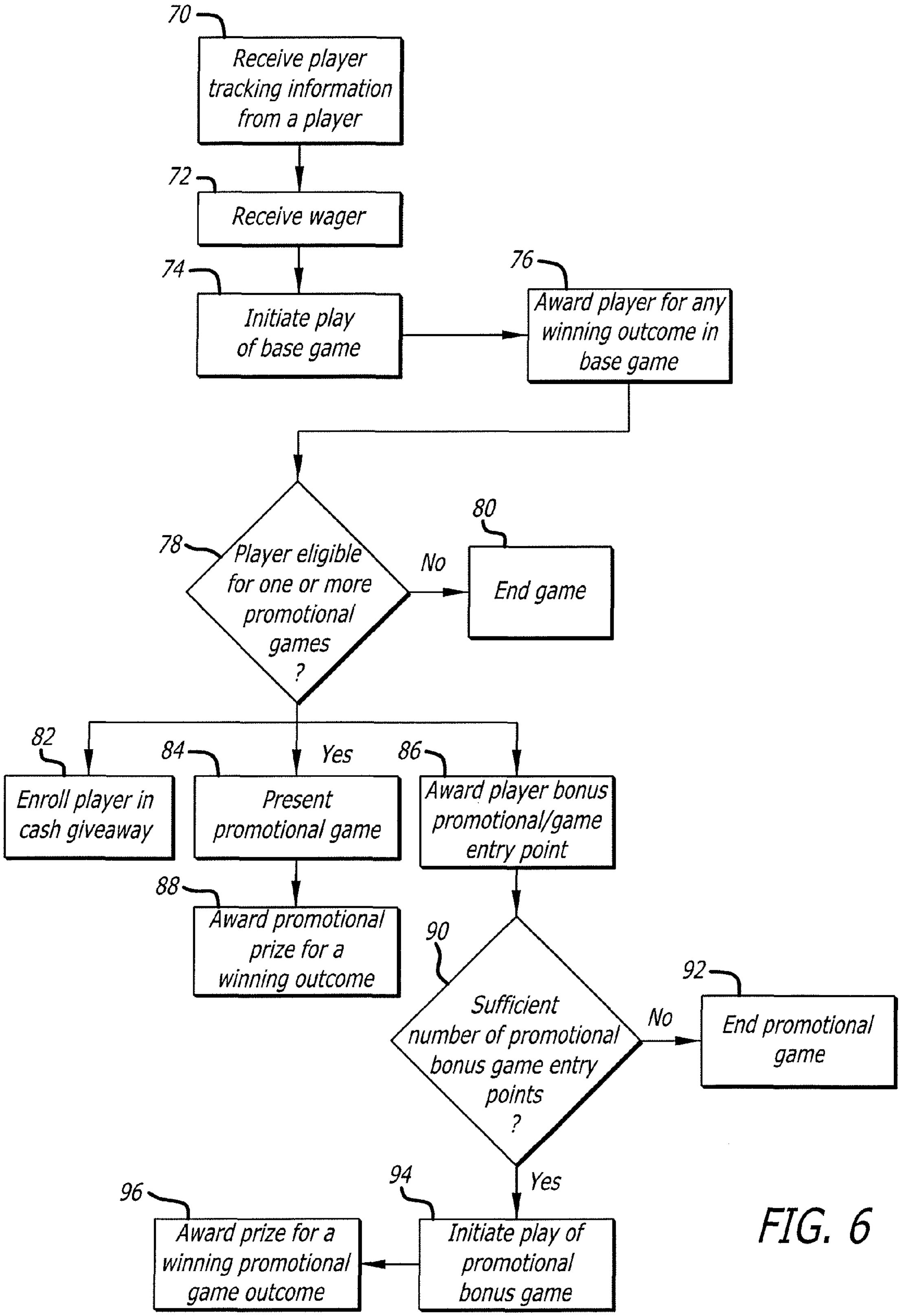
FIG. 6 is a flow diagram of another method of presenting a multi-tiered promotional game on a gaming device.

FIG. 6 illustrates another method of presenting a multi-tiered promotional game. As shown in FIG. 6, the gaming machine 10 receives player tracking information from the player at step 70. At step 72, a player wager is received on the gaming machine 10, and play of the base game is initiated at step 74. The player is awarded for any winning outcome in the primary game at step 76. The gaming machine 10 determines whether the player is eligible for one or more promotional games at the conclusion of the primary game at step 78. If the player is not eligible for the multi-tiered promotional game, the game ends at step 80. If the player is eligible for the multi-tiered promotional game, the player is enrolled a cash giveaway at step 82, the promotional base game is presented to the player at step 84, and the player is awarded a promotional bonus entry point at step 86. At the conclusion of the promotional base game, the player is awarded a promotional prize for a winning outcome at step 88, and the player is also awarded a bonus entry point. The gaming machine then determines whether the player has a sufficient number of promotional bonus entry points at step 90. If the player does not have a sufficient number of points, the promotional game ends at step 92. If the player has a sufficient number of promotional bonus entry points, play of the promotional bonus game is initiated at step 94. At the conclusion of the promotional bonus game, a prize is awarded to the player at step 96.

Figure 7:
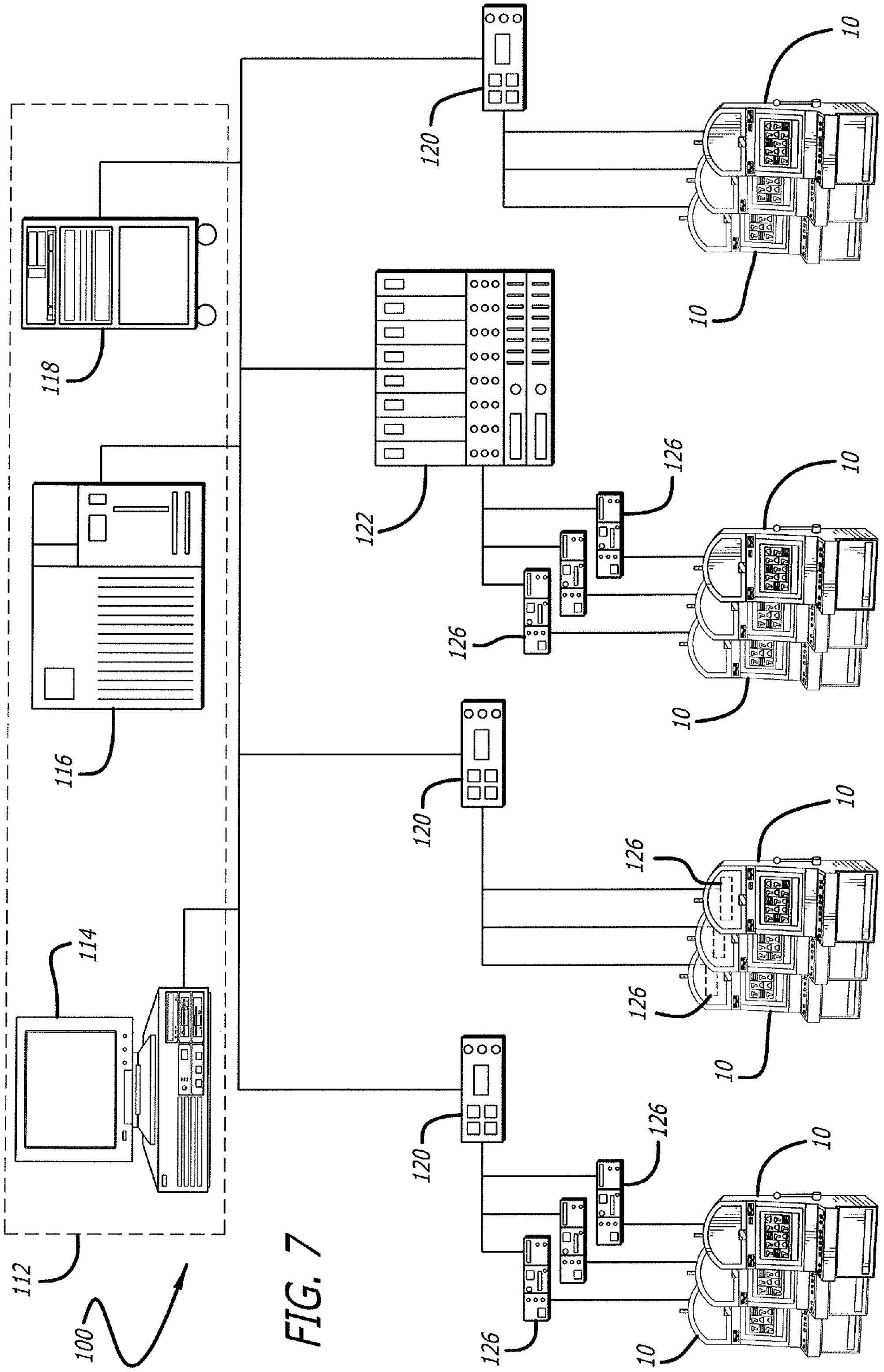
FIG. 7 is a diagram of one embodiment of a gaming system including a plurality of gaming machines presenting a keno game having a bonus round.

Referring now to FIG. 7, a casino gaming system 100 is illustrated. The casino gaming system 100 comprises one or more gaming machines 10. The gaming machines 10 illustrated in FIG. 7 act as terminals for interacting with a player playing a casino game. Networking components facilitate communications between the system server 112 and game management units 126 that control displays for carousels of gaming machines 10 across a network. Game management units (GMU's) 126 connect gaming machines to networking components and may be installed in the gaming machine cabinet or external to the gaming machine 10. The function of the GMU 126 is similar to the function of a network interface card connected to a desktop personal computer (PC). Some GMU's 126 have much greater capability and can perform such tasks as presenting and playing a game using a display (not shown) operatively connected to the GMU 126. In one embodiment, the GMU 126 is a separate component located outside the gaming machine 10. Alternatively, in another embodiment, the GMU 126 is located within the gaming machine 10. Optionally, in an alternative embodiment, one or more gaming machines 10 connect directly to a network and are not connected to a GMU 126.

The gaming machines 10 are connected via a network to a network bridge 120, which is used for networking, routing and polling gaming machines, including slot machines. The network bridge 120 connects to a back end system 112. Optionally, the gaming machines 10 may connect to the network via a network rack 122, which provides for a few number of connections to the back end system 112. Both network bridge 120 and network rack 122 may be classified as middleware, and facilitate communications between the back end system 112 and the game management units 126. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system. In one embodiment, as illustrated in FIG. 7, the back end system 112 is configured to include three servers: a slot floor controller 114, a casino management server 116 and a casino database 118. The slot floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 112 performs several functions. For example, the back end system 112 can collect data from the slot floor as communicated to it from other network components, and maintain the collected data in its database. The back end system 112 may use slot floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, sound data, and optimal display configurations for one or more displays for one or more system game.

Of course, one will appreciate that a gaming system 100 may also comprise other types of components, and the above illustrations are meant only as examples and not as limitations to the types of components or games used in a casino gaming system presenting a keno game having a bonus round.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming device-enabled gaming system, comprising:

a physical network that connects and enables communication between components in the gaming device-enabled gaming system;

a plurality of gaming devices, each gaming device presenting a primary game on a main display and one or more multi-tiered promotional games that are supplemental to and distinct from the primary game, wherein the one or more multi-tiered promotional games have a promotional game component that is a pre-scheduled game occurring on a predefined cycle that has a pre-selected outcome and a cash giveaway component, wherein the one or more multi-tiered promotional games are presented in a pop-up window on the main display, each gaming device including a gaming device processor for managing play of the primary game;

each gaming device further comprising: (i) a plurality of input devices including: (a) an acceptor of a first physical item associated with a first monetary value; (b) a cashout button actuatable to cause an initiation of a payout associated with a credit balance; and (ii) at least one gaming device memory device storing a plurality of gaming device instructions;

a promotional game server having a promotional game server processor, wherein the promotional game server manages the one or more multi-tiered promotional games;

a player tracking server having a server processor and a database of player gaming data, wherein eligibility of a player is determined for a multi-tiered promotional game based on player gaming data, and one or more player tracking components associated with each gaming device for tracking player gaming data, wherein the player is enrolled in the cash giveaway component if the player is deemed eligible for the multi-tiered promotional game based on player gaming data;

wherein promotional credits are awarded to the player for a winning outcome in the promotional game component, wherein the player is awarded a bonus game entry point for the promotional bonus game component when the promotional game component is presented to the player, and wherein a predetermined number of bonus game entry points are required to play the promotional bonus game component.

2. The gaming device of claim 1, further comprising a video switcher and touch router device operatively coupled to the main display.

3. The gaming device of claim 2, wherein the multi-tiered promotional game is presented in a pop-up window on the main display via the video switcher and touch router device.

4. A gaming device-enabled gaming system, comprising:

a physical network that connects and enables communication between components in the gaming device-enabled gaming system;

a plurality of gaming devices, each gaming device presenting a primary game on a main display and one or more multi-tiered promotional games that are supplemental to and distinct from the primary game, wherein the one or more multi-tiered promotional games have a promotional game component that is a pre-scheduled game occurring on a predefined cycle that has a pre-selected outcome and a cash giveaway component, wherein the primary game is presented in a first portion of the main display and the one or more multi-tiered promotional game are presented in a second portion of the main display, each gaming device including a gaming device processor for managing play of the primary game;

each gaming device further comprising: (i) a plurality of input devices including: (a) an acceptor of a first physical item associated with a first monetary value; (b) a cashout button actuatable to cause an initiation of a payout associated with a credit balance; and (ii) at least one gaming device memory device storing a plurality of gaming device instructions;

a promotional game server having a promotional game server processor, wherein the promotional game server manages the one or more multi-tiered promotional games;

a player tracking server having a server processor and a database of player gaming data, wherein eligibility of a player is determined for a multi-tiered promotional game based on player gaming data, and one or more player tracking components associated with each gaming device for tracking player gaming data, wherein the player is enrolled in the cash giveaway component if the player is deemed eligible for the multi-tiered promotional game based on player gaming data;

wherein promotional credits are awarded to the player for a winning outcome in the promotional game component, wherein the player is awarded a bonus game entry point for the promotional bonus game component when the promotional game component is presented to the player, and wherein a predetermined number of bonus game entry points are required to play the promotional bonus game component.

5. The gaming device of claim 4, further comprising a video switcher and touch router device operatively coupled to the main display.

6. The gaming device of claim 5, wherein the multi-tiered promotional game is presented in a pop-up window on the main display via the video switcher and touch router device.

* * * * *